US012662987B2

(12) United States Patent

Gadola, III

(10) Patent No.: US 12,662,987 B2

(45) Date of Patent: Jun. 23, 2026

(54) MECHANICAL-ONLY, MULTI-USE, AUTOMATICALLY RETRACTABLE VERTICAL WIND TURBINE, USING WING DRAG

(71) Applicant: Guy P. Gadola, III, Sharpsville, PA (US)

(72) Inventor: Guy P. Gadola, III, Sharpsville, PA (US)

( * ) Notice: Subject to any disclaimer, the term of this patent is extended or adjusted under 35 U.S.C. 154(b) by 0 days.

(21) Appl. No.: 18/664,302

(22) Filed: May 15, 2024

(65) Prior Publication Data

US 2025/0237191 A1 Jul. 24, 2025

Related U.S. Application Data

(60) Provisional application No. 63/623,038, filed on Jan. 19, 2024.

(51) Int. Cl.
*F03D 3/06* (2006.01)
*F03D 3/00* (2006.01)

(52) U.S. Cl.
CPC ............. *F03D 3/066* (2023.08); *F03D 3/005* (2013.01); *F05B 2240/2022* (2013.01); *F05B 2240/218* (2013.01)

(58) Field of Classification Search
CPC .......... F03D 3/005; F03D 3/007; F03D 3/009; F03D 3/011; F03D 3/066; F05B 2240/2022; F05B 2240/218
See application file for complete search history.

(56) References Cited

U.S. PATENT DOCUMENTS

| | | | |
|---|---|---|---|
| 4,342,539 A | 8/1982 | Potter | |
| 6,926,491 B2 | 8/2005 | Migler | |
| 6,979,170 B2 | 12/2005 | Dery | |
| 9,500,180 B1 | 11/2016 | Chandler | |
| 10,344,742 B2 * | 7/2019 | Whitehouse | ............ F03D 13/25 |
| 12,071,930 B1 * | 8/2024 | Inyang | ................... F03D 3/005 |
| 2004/0120820 A1 | 6/2004 | Dery | |
| 2010/0172759 A1 | 7/2010 | Sullivan | |

(Continued)

FOREIGN PATENT DOCUMENTS

| | | |
|---|---|---|
| CN | 103470454 A | 12/2013 |
| CN | 104912742 A | 9/2015 |

(Continued)

*Primary Examiner* — Sang K Kim

(74) *Attorney, Agent, or Firm* — The Harris Firm

(57) ABSTRACT

What is disclosed is a vertical-axis wind turbine that looks somewhat similar to a vertical pole during no-wind or relatively low-wind conditions, i.e., when the turbine is waiting for relatively windy conditions, and that transitions between its "waiting state" and "wind harnessing state" automatically. Yet, to automatically transition between states, the turbine uses relatively few moving mechanical assemblies and uses no electric parts. The turbine has levers attached radially to a vertical mast and one or more wings attached to each lever. Each wing's mounting angle causes the wing to move the lever to which it is attached to deploy the wing(s) attached to that lever to rotate the mast. At an approximate rotation point of the mast, to avoid the deployed wing(s) from unduly opposing the mast's rotation, the wing's angle facilitates the retraction of the wing(s). The net drag of the wing(s) serves to rotate the mast.

5 Claims, 5 Drawing Sheets

(56)         References Cited

U.S. PATENT DOCUMENTS

2011/0033293 A1     2/2011  Cavalieri
2011/0042958 A1*    2/2011  Vander Straeten  ..... F03D 13/20
                                                              290/55
2024/0401562 A1*   12/2024  Willis  ..................... F03D 13/20

FOREIGN PATENT DOCUMENTS

CN        206144712  U      5/2017
CN        104481810  B      6/2017
CN        111637006  A      9/2020
ES          2449669  B1     3/2015
GB          2427003  A     12/2006

* cited by examiner

MECHANICAL-ONLY, MULTI-USE, AUTOMATICALLY RETRACTABLE VERTICAL WIND TURBINE, USING WING DRAG

CROSS-REFERENCE TO RELATED APPLICATIONS

This non-provisional application is related to provisional application U.S. 63/623,038, having a filing date of Jan. 19, 2024, the inventor being Guy P. Gadola, III, and having a title of "Mechanical-Only, Multi-Use, Automatically Retractable Vertical Wind Turbine, Using Wing Drag."

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

Field of the Invention: The present invention pertains broadly to the field of harnessing wind energy in residential areas. To attempt to blend into residential areas, this present invention retracts during non-windy weather into a form factor somewhat similar to a pole while allowing itself to serve as another use (e.g., as a flag pole).

Wind energy conversion devices that automatically retract and deploy are especially useful where wind is often weak but occasionally strong and where a typical permanently deployed wind turbine would look out of place. One of those places is, and not limited to, a house's front yard.

Ideally, a device in a house's front yard would lend itself to being serviced relatively easily. Thus, it could be especially useful for a turbine to be relatively mechanically simple while still being retractable. A relatively mechanically simple retractable turbine that has no electric or electronic parts would require little to no training in electricity or electronics.

The prior art does not seem to yet include an automatic, mechanical only, dual-use, higher torque, retractable vertical axis, not requiring fabric sails, that has few moving parts. Below, those and other properties useful in some situations are discussed.

What is Needed (or Especially Useful) in Some Situations

In some situations, a retractable vertical wind turbine is needed or especially useful that has the following abilities:

Property A. Serves as a Vertical Pole for an Additional Use

It could make sense for a purchaser who is considering buying both a retractable vertical wind turbine and a product that uses a vertical pole to consider buying a vertical wind turbine that can also serve as that product. Some examples of that product are a flag pole, a utility pole, and a pole for a computer network access point. Purchasing a single product might be more cost effective than purchasing two separate products in some situations.

Property B. Looks Akin when Retracted to a Utility Pole, Flag Pole, or Similar Pole To emphasize that when it is important for a retractable vertical axis wind turbine to serve as a vertical pole for an additional use, it is also important that the retractable vertical axis wind turbine have a form factor when retracted to what is similar to a vertical pole in some circumstances. An example of such a circumstance is when the vertical axis wind turbine is serving as a flag pole where a local homeowners association allows flag poles but not structures that deviate significantly from a flag pole's form factor. A similar situation could involve utility poles.

Property C. Uses No Electrical or Electronic Parts

Herein, the term mechanical-only device refers to a device that has no computerized or electronic control system, has no electric actuators that receive control directives, and has no electrical components or assemblies. A mechanical-only retractable and deployable vertical wind turbine is needed in some situations. Some examples of those situations are listed here:

- when electrical or electronic components (e.g., computer chips) are unavailable or their price makes their use impractical because the supply of electrical or electronic components is constrained
- when an electromagnetic event would have disabled the vertical wind turbine were the turbine to have employed electrical or electronic components (and when it is too expensive to use electrical or electronic components that could withstand such an event)
- when the use of electronic or electronic components or assemblies would cause unacceptable levels of electromagnetic radiation (and when it is too expensive to use electrical or electronic components or assemblies that could mitigate such radiation)

Property D. Has No Separate Mechanical Control Unit

Situations where it is useful for a vertical-axis wind turbine to not have a separate mechanical control unit include the following:

- when having a mechanical control unit that is separate from the wind turbine would unduly complicate maintenance and installation because the separate mechanical control unit has mechanical links to the device that would need to be installed and maintained
- when space is not available for a separate mechanical control unit Property E. Deploys without Using Stored Energy Mechanical simplicity is one aspect of deploying without using stored energy. If stored energy were to be used to deploy, then

- there must be a link between an energy store and a deployment mechanism,
- an energy store must be embedded in a deployment mechanism, or
- both a link to a non-embedded energy store and an embedded energy store must be used.

Another aspect of deploying without stored energy is efficiency. Stored energy used to deploy is not available to be used for another purpose (unless deployment has a secondary purpose).

Property F. Deploys without Using Transmitted Energy

In some situations, it is impractical to deploy the turbine using energy transmitted from a remote source (e.g., when transmitted energy is unavailable or cost prohibitive).

Property G. Provides Relatively Higher Torque Directly

Direct higher torque is especially useful in some situations. One example is where a central drive shaft uses its higher torque to directly drive a large load, such as multiple pumps in parallel.

Property H. Automatically Deploys and Retracts

When it is not practical for a person to manually attend to a deployment, retraction, or both, it is important for the device to deploy and retract automatically.

Property I. Uses not More than One Moving-Part Assembly Per Retractable Blade

In some situations, a type of mechanical simplicity is preferable where a retractable turbine uses relatively few moving parts. It might be easier to maintain a retractable turbine that uses not more than one moving-part assembly per retractable blade to retract said blade than it would be to maintain a retractable turbine that uses more. Fewer moving parts could translate into fewer lubrication points.

Property J. Retracted when there is No Wind

It is useful for a turbine to be retracted when there is no wind during then when a) wind is usually weak, but occasionally strong, and b) zoning regulations would not permit or neighbors would object to a usually deployed turbine.

Property K. Uses Wing to Rotate Mast and to Deploy; does not Require Fabric Sails In combination with the other properties listed in this section, some situations might require that a vertical axis wind turbine does not require fabric sails to operate. Such operating environments could include those where protecting the fabric sails or maintaining them is economically disadvantageous.

Prior Art of Retractable Wind Turbines

Each instance of prior art discussed in this present subsection may be useful in some situations, but unfortunately each instance of prior art discussed below does not seem to have all properties listed directly above. In the discussion below, when it is stated that a specific prior art does not seem to have a certain property, it may be the case that the specific prior art also does not have other properties listed above.

Publication U.S. Pat. No. 9,500,180B1: It seems reasonable to conclude that the retracted state of devices described in Publication U.S. Pat. No. 9,500,180B1 do not have Property B. Consider that U.S. Pat. No. 9,500,180B1 describes a set of devices where each device is a retractable vertical axis wind turbine that retracts its height instead of its diameter. If its approximately constant diameter is consistent with the form factor of a typical flag or utility pole when retracted, then it would seem that the diameter would be too narrow in order for the wind turbine to be useful at low to medium wind speeds.

Publication U.S. Pat. No. 6,979,170B2: Because the vertical wind turbine described in Publication U.S. Pat. No. 6,979,170B2 seems to approximate a Darrieus wind turbine, it seems to not have Property G.

Publication CN201310463316: Because all claims of publication CN201310463316 rely on its claim 1 and because claim 1 refers to a generator, all devices claimed by that application seem to not have Property C.

Publication CN104481810B: Because all claims of CN104481810B rely on its claim 1 and because that claim refers to a generator, all devices claimed by that application seem to not have Property C.

Publication CN104912742A: Because all claims of CN104912742A rely on its claim 1 and because that claim refers to a generator, all devices claimed by that application seem to not have Property C.

Publication CN111637006A: Because the device described in CN111637006A seems to approximate a Darrieus wind turbine, it seems to not have Property G.

Publication CN206144712U: Because all claims of CN206144712U rely on its claim 1 and because that claim refers to a controller, CN206144712U seems to claim devices that do not have Property C.

Publication U.S. Pat. No. 4,342,539A: Publication U.S. Pat. No. 4,342,539 seems to use electric or electronic components and/or uses more than a relatively few moving parts to deploy and retract. Thus, that publication seems to describe devices that do not have Properties C or I.

Publication U.S. Pat. No. 6,926,491B2: Publication U.S. Pat. No. 6,926,491B2 discloses a device that does not seem to be retractable. The horizontal arms of U.S. Pat. No. 6,926,491B2 seem to remain horizontal and do not retract. That constant width device seems to have a form factor inconsistent with that of a pole. Hence, that device could be deemed to not have Property B.

Publication GB2427003A: Publication GB2427003A discloses a device that seems to use electric components (e.g., "four electrical winches 34."). Thus, the device described in that publication does not seem to have Property C.

Publication ES2449669B1: Because the abstract of ES2449669B1 refers to a tensioning motor that is electric, the device described by ES2449669B1 seems to not have Property C.

Publication US20040120820A1: The device described by publication US20040120820A1 does not seem to deploy automatically. Also, it seems to be a higher-speed/lower-torque design rather than a lower-speed/higher-torque one. Thus, it seems to not have Properties G and H.

Publication US2010/0172759A1: Publication US2010/0172759A1 seems to describe a device that has one or more electronic parts (e.g., a CPU). Thus, it seems to not have Property G.

Publication US2011/0033293A1: Because publication US2011/0033293A1 describes a horizontal-axis device, it is not included in the prior art of vertical-axis ones.

Publication CN104912742A: Publication CN104912742A seems to describe a device that remains fully deployed during a no wind condition. Thus, it is not included in the prior art of wind turbines that are retractable. The device does not have property J. (Also, because the device also seems to mainly use lift instead of drag to rotate, the device seems not to have Property G.)

BRIEF SUMMARY OF THE INVENTION

The invention is a vertical axis wind-energy-conversion system that has wings that are deployed and retracted automatically, yet has no electronic or electric control system.

A novel aspect of this invention is how it achieves automatic, mechanical-only, deployment and retraction using relatively few moving parts: ambient wind power moves lever-arm-attached wings to deploy the wings when the wings are positioned to help drive a central vertical mast in a desired rotational direction. And when the wings would not helpfully drive the mast if the wings were to remain deployed, the wings' design and mounting configuration facilitate the retraction of those wings.

The invention is especially suitable for areas that usually experience low wind speeds and occasionally see higher wind speeds. When wind speeds are relatively low, the invention may look somewhat similar to a flag pole, light pole, communications tower, etc.

The invention has a central vertical pole. Radiating horizontally from the said central vertical pole are two or more axles, hinges, or pivots. To each said axle, hinge, or pivot is attached a lever arm. To each lever arm is attached one or more wings.

Each wing is designed (An exemplificative design is given in the section entitled, "Detailed Description of the Invention.") to move the lever arm to deploy the wing when the weather is relatively windy and when the said wing would be positioned to rotate (via drag) the said central vertical pole in a desired direction if the wing were to be deployed. Each wing is designed to facilitate the movement of the lever arm to retract the wing when the weather is not relatively windy or when the said wing is approaching a rotational region or is in a region where the wing would unduly oppose the rotating of the central vertical mast in a desired direction if the wing were to remain deployed or would be deployed.

BRIEF DESCRIPTION OF THE SEVERAL VIEWS OF THE DRAWING

The drawings show features of an exemplative embodiment of the present invention.

DETAILED DESCRIPTION OF THE INVENTION

Described in this section is an exemplificative embodiment of the present invention.

Figure 1:
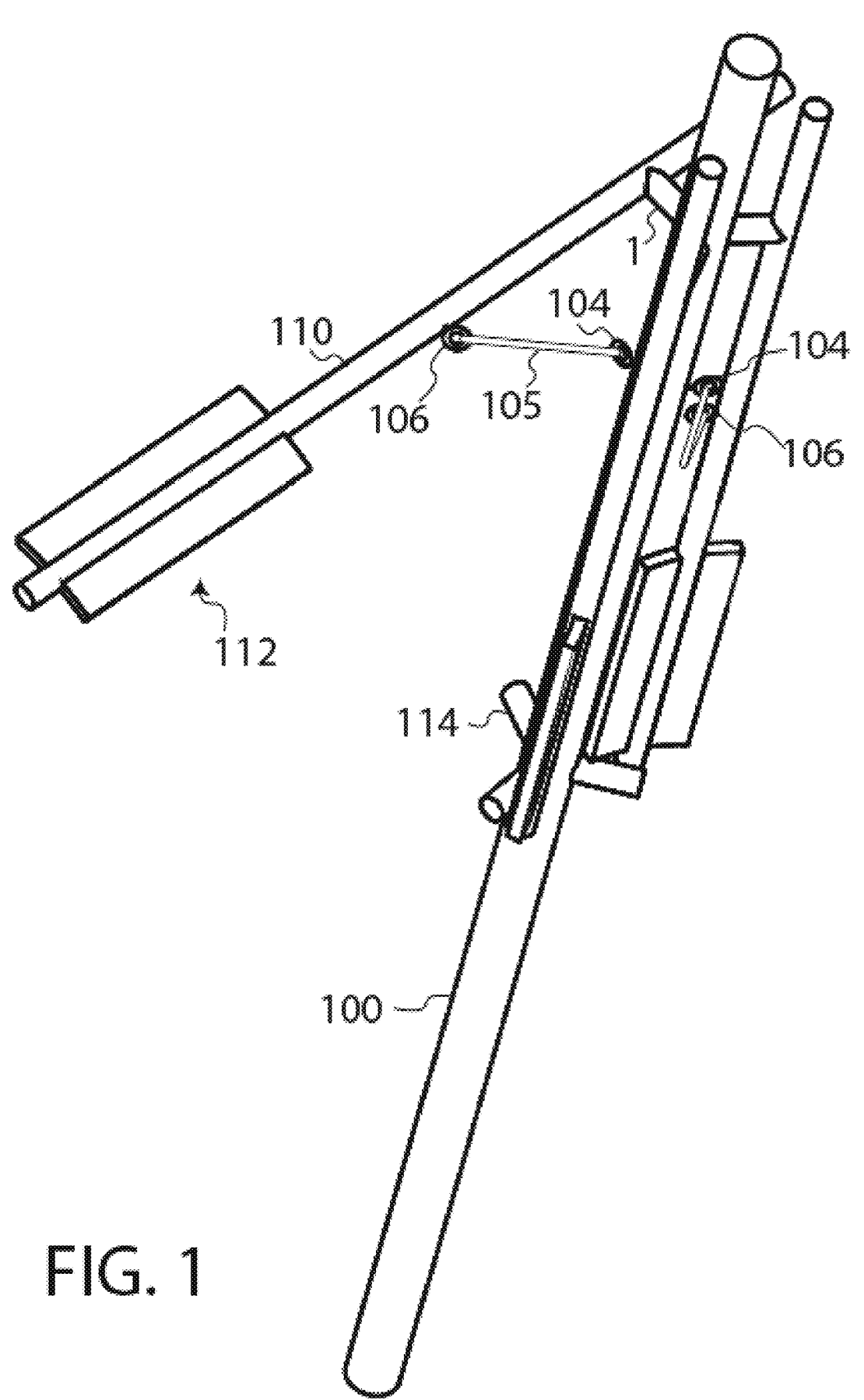
FIG. 1 shows from slightly above and at an angle an embodiment when wind has lifted a wing to the highest point allowed by a tangle-free strap.

FIG. 1 shows from slightly above and at an angle an embodiment of the device having connected to its central vertical mast (100) three axles (e.g., 1) arranged radially around the central vertical mast (100). To each axle (1) is connected a lever arm (110). Connected to each lever arm (110) is a wing (112). A wing (112) is shown in FIG. 1 lifted by wind to the highest point allowed by a tangle-free strap (105). The wing (112) is attached to a lever arm (110) that is attached to an axle (1) which is attached to the central vertical mast (100). Attached to the central vertical mast is an eyebolt (104) that is attached to said tangle-free strap (105) that is attached to another eyebolt (106) that is attached to said lever arm (110). Attached to the central vertical mast (100) is a backstop (114), which prevents the said lever arm (110) from rotating about its axle past the said backstop (114) when gravity causes the wing (112) to move toward the ground. Gravity may be stronger than the lifting forces caused by the wind when, for example, the wind has subsided or when the central vertical mast (100) has rotated the axle (1) so that the wing (112) attached to the said axle (1) via the lever arm (110) is plunging into wind.

Figure 2:
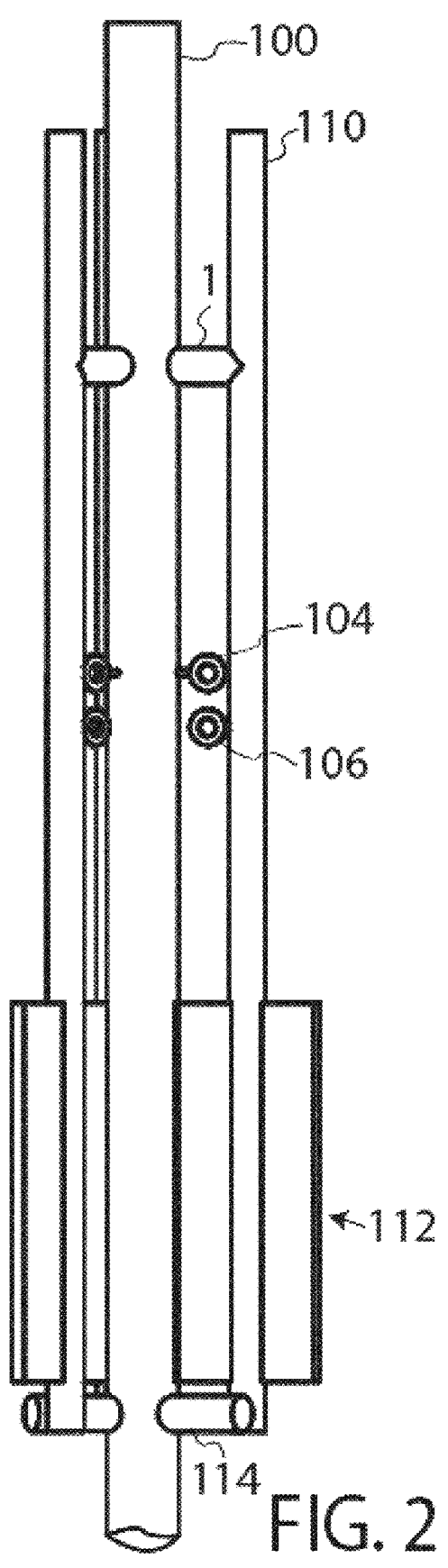
FIG. 2 shows the top portion of an embodiment from the side when there is no or little wind.
Figure 3:
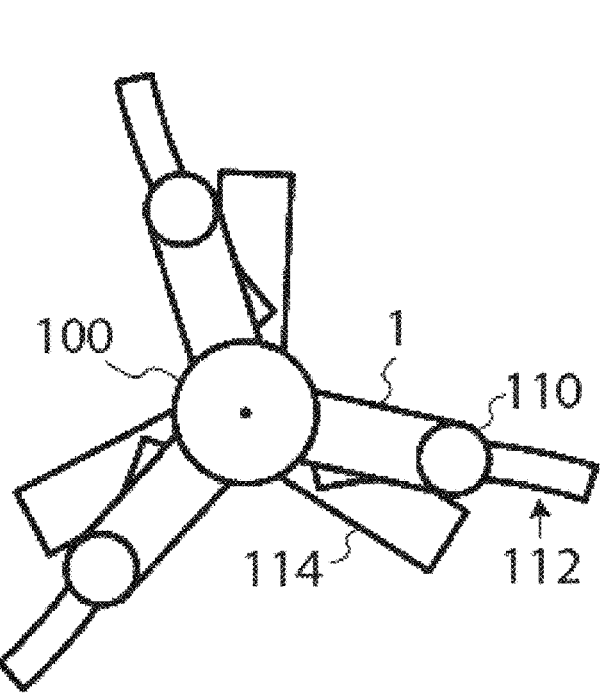
FIG. 3 shows the embodiment and state featured in FIG. 2 from the perspective of being above the embodiment.

A no- or low-wind condition is shown in FIG. 2 and FIG. 3. FIG. 2 shows the top of the embodiment from the side, where each of the three lever arms (e.g., 100) is in the neutral position. In other words, gravity has pulled each wing (112) to the lowest point allowed by the structure of the embodiment.

From directly above the embodiment, FIG. 3 shows the embodiment. Each wing (112) is curved and oriented in a fashion similar to that used in a Savonius-type vertical axis turbine to help rotate the central vertical mast (100) counterclockwise, as viewed from above.

Figure 4:
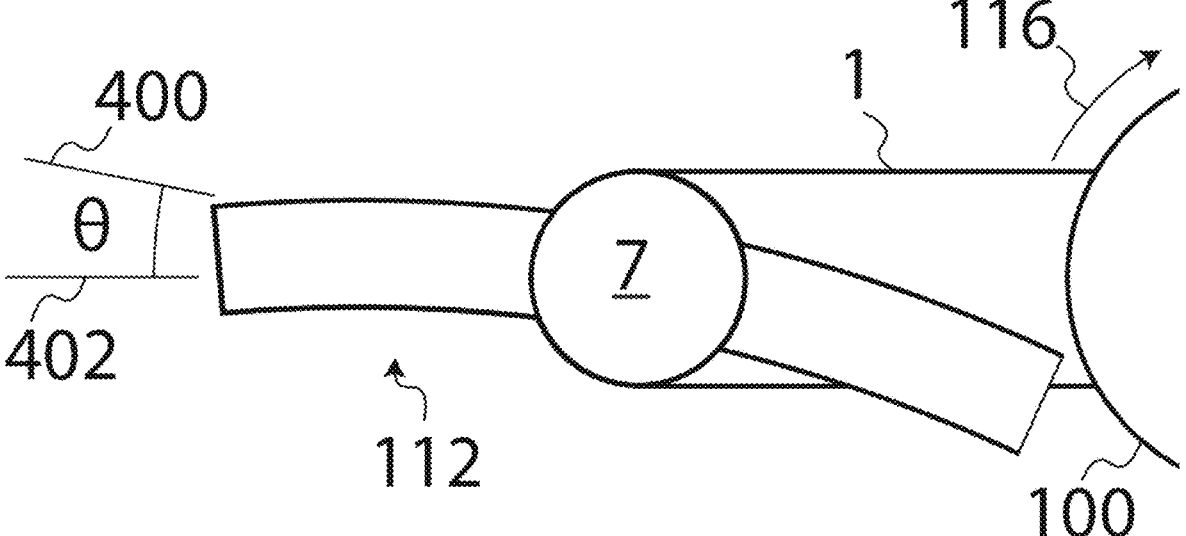
FIG. 4 shows an example of a mounting angle of a wing in an embodiment as mounted on a lever arm. The figure shows the lever arm as viewed along the lever arm's longitudinal axis from the end of the lever arm that is nearest to where the wing is mounted.

Each wing (112) has a non-zero mounting angle with respect to the axle (1) to which the wing is attached via a lever arm. FIG. 4 shows a wing (112) having a mounting angle (as represented by the Greek letter θ) as viewed along the lever arm's longitudinal axis from the end of the lever arm that is nearest to where the wing is mounted (7) when the lever arm is in the neutral position. That is, FIG. 4 is showing a subset of the embodiment as viewed from the bottom of the embodiment when the lever arm in that subset is generally parallel to the central vertical mast (100) and when the length of the lever arm having the wing attached is closer to the ground than the opposite length of the lever arm as bifurcated by the lever arm's axle (1). The wing's lateral axis (400) is oriented away from the axle's longitudinal axis (402) to a degree represented by the measure the angle between the two axes (θ) and is oriented toward the central vertical mast's desired rotational direction (116). Because the perspective of FIG. 4 is from the ground, the central vertical mast's desired rotational direction (116) is shown to be clockwise in FIG. 4.

Figure 5:
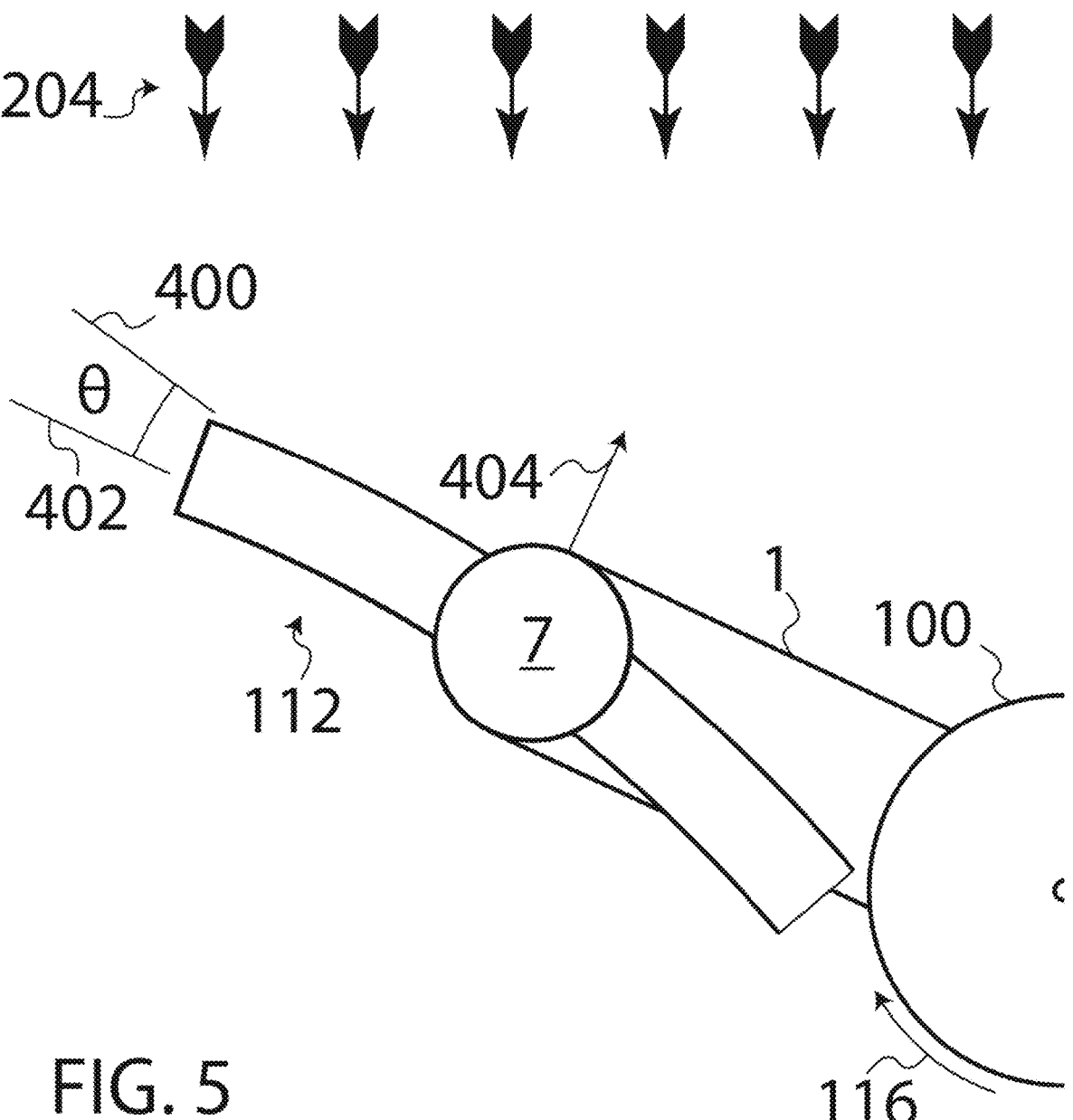
FIG. 5 shows the embodiment and state featured in FIG. 4 when the central vertical mast has rotated an axle into the wind which is nearing the rotation point about the central vertical mast where the wing begins to rotate about the axle the lever arm to which the wing and axle are attached.

From the same viewing perspective used in FIG. 4, FIG. 5 shows the embodiment and state featured in FIG. 4 when the central vertical mast has rotated an axle into the wind (the direction that the wind is moving is indicated by the direction to which the arrows referenced by 204 are pointing) which is nearing the rotation point about the central vertical mast (100) where the wind begins to lift the wing (112) so that the lever arm begins to rotate about the axle to which the lever arm is attached in the direction indicated by the arrow indicated by reference 404 in FIG. 5.

Figures 6, 7:
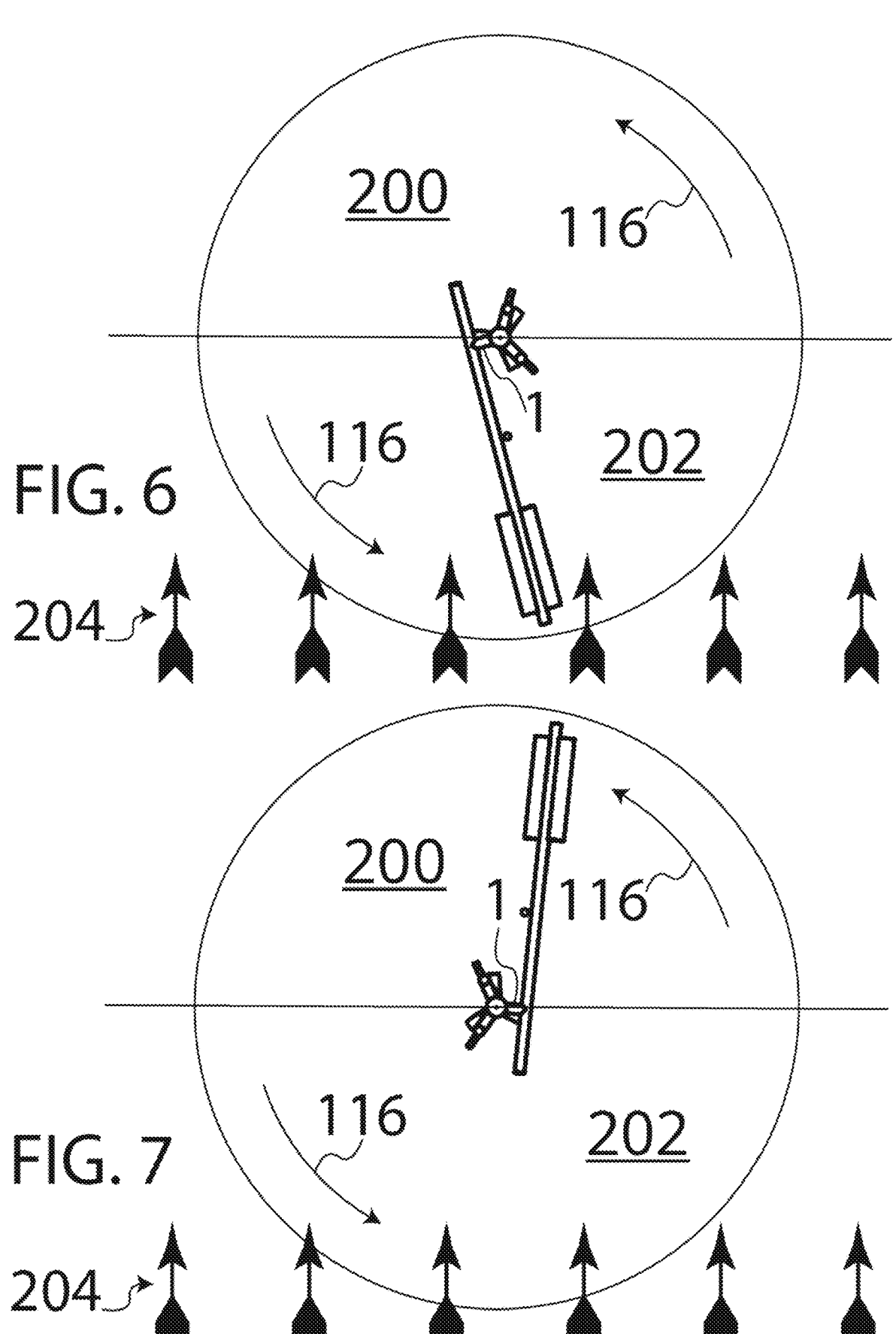
FIG. 6 and FIG. 7 show a wing's approximate earliest deployment and latest retraction rotational points, respectively, in order to facilitate rotation of the central vertical mast counter-clockwise as viewed from the top.

Those skilled in the art of wing design are able to choose the mounting angle of the wing (θ) so that the wind tends to lift the wing when the lifting of the wing would help rotate the central vertical mast counter-clockwise as viewed from above the embodiment. Such a time is approximately shown in FIG. 6. FIG. 6 shows from above the embodiment an approximate point within the windward side of the embodiment (202) where an axle (1) has rotated such that when the wing to which it is attached deploys. That is, the wind (204) lifts the wing. That deployment point is selected so that the deployed wing is mostly on the right-hand side of the central vertical mast when viewed from above the mast. On the right-hand side of the central vertical mast, the wing's drag tends to rotate the mast in the desired rotational direction (116), counter-clockwise as viewed from above the central vertical mast.

FIG. 7 shows the axle (1) approaching the leeward side (200) of the embodiment. If the wing were to remain deployed as the axle (1) rotates into the leeward side (200) of the embodiment, the wind's drag on the deployed wing would tend to resist the central vertical mast's counter-clockwise rotation. To help reduce that resistance, those skilled in the art of wing design could choose the mounting angle of the wing (θ) and other parameters of the wing so that gravity would tend to retract the wing before the point where if the wing were to remain deployed, the wing would tend to unduly resist the central vertical mast's counterclockwise rotation (as viewed from above the central vertical mast).

In order for a deployed wing to facilitate the central vertical mast's desired rotation, the wing should not be in a deployed state when the axle of the lever arm to which the wing is attached is on the leeward side of the central vertical mast in this embodiment. The leeward side can be described by the portion of this embodiment that is in the leeward half-circle referenced by the number 200 in FIGS. 4, 5, 9, and 10. Thus, in those figures, the sets of vertical arrows referenced by the number 204 point toward the wind's destination.

Within the windward side (202) of the central vertical mast, there is a region that when the axle of a lever arm is in that region, the act of deploying the wind attached to the lever arm (110) helps to rotate the central vertical mast counter-clockwise (as viewed from above the central vertical mast).

FIG. 6 shows an axle (1) at a location where that region approximately begins. The wing may remain deployed until the rotation of the central vertical mast causes the wing's drag to start to oppose the counter-clockwise rotation of the central vertical mast (as viewed from above the central vertical mast). The central vertical mast is shown nearing or approximately at that state of rotation in FIG. 7.

Weathering Hurricane-Strength Winds

Those skilled in the art of modeling forces, material strength, and wing design could most likely design an embodiment to deploy two opposing lever arms simultaneously to slow the rotation of the central vertical mast.

What is claimed is:

1. A vertical-axis wind-energy-conversion system (VAWECS) comprising:

a central vertical mast;

a plurality of axles, hinges, or pivots connected radially to the central vertical mast so that each axle's, hinge's, or pivot's axis of rotation is perpendicular to the central vertical mast's axis of rotation;

a plurality of lever arms where each lever arm is connected to a said axle, hinge, or pivot, a plurality of wings where each wing is mounted on a said lever arm so that the majority of the wing or the entire wing is on one side of one or more lever arm axle, hinge, or pivot to form an assembly of the wing and lever arm and where the wing has a camber and when the assembly of the wing and lever arm is oriented so that the lever arm is generally perpendicular to the vertical mast the wing's positive-camber side generally faces toward a rotational direction of the central vertical mast and the wing's edge furthest from the central vertical mast is tilted, about the longitudinal axis of the lever arm, toward the rotational direction of the central vertical mast.

2. The VAWECS of claim 1 further comprising a plurality of opening angle limiters where each lever arm has a said limiter connecting the lever arm to the central vertical mast.

3. The VAWECS of claim 1 further comprising a plurality of backstops where a said backstop for each lever arm is mounted on the central vertical mast generally on or near the longitudinal line of the vertical mast passing through the point at which the lever arm's axle, hinge, or pivot meets the central vertical mast so that the lever arm is rotationally in front of the backstop with respect to the rotation of the lever arm about the lever arm's axle, hinge, or pivot in the same general direction to which the convex side of the lever arm's wing is facing.

4. The VAWECS of claim 1 further comprising a plurality of backstops where a backstop for each lever arm is integrated into the said lever arm's axle or hinge.

5. The VAWECS of claim 1 further comprising a plurality of opening angle stops where an opening angle stop for each lever arm is integrated into the said lever arm's axle, hinge, or pivot.

* * * * *